United States Patent
Wu et al.

(10) Patent No.: US 7,864,905 B2
(45) Date of Patent: Jan. 4, 2011

(54) INTERFERENCE ALLEVIATION EQUALIZING APPARATUS OF MULTI-CARRIER COMMUNICATION SYSTEM AND METHOD THEREOF

(75) Inventors: Kuo-Ming Wu, Nan-Tou Hsien (TW); Der-Zheng Liu, Tai-Nan (TW)

(73) Assignee: Realtek Semiconductor Corp., Hsinchu (TW)

(*) Notice: Subject to any disclaimer, the term of this patent is extended or adjusted under 35 U.S.C. 154(b) by 1424 days.

(21) Appl. No.: 11/161,585

(22) Filed: Aug. 9, 2005

(65) Prior Publication Data

US 2006/0029236 A1 Feb. 9, 2006

(30) Foreign Application Priority Data

Aug. 9, 2004 (TW) .............................. 93123842 A

(51) Int. Cl.
*H04B 1/10* (2006.01)
(52) U.S. Cl. .................... 375/350; 375/346; 375/316; 455/307; 708/300
(58) Field of Classification Search ............... 375/350, 375/346, 316; 455/307; 708/300
See application file for complete search history.

(56) References Cited

U.S. PATENT DOCUMENTS

| | | | | |
|---|---|---|---|---|
| 5,434,889 A * | 7/1995 | Baier | ....................... | 375/344 |
| 7,212,569 B1 * | 5/2007 | Clark | ....................... | 375/233 |
| 2001/0028637 A1 * | 10/2001 | Abeta et al. | ................ | 370/335 |
| 2002/0146063 A1 * | 10/2002 | Gorokhov et al. | .......... | 375/148 |
| 2002/0161560 A1 * | 10/2002 | Abe et al. | .................... | 702/196 |
| 2002/0186650 A1 * | 12/2002 | Castelain | .................... | 370/203 |
| 2003/0043887 A1 * | 3/2003 | Hudson | ...................... | 375/144 |
| 2004/0062302 A1 * | 4/2004 | Fujii et al. | .................. | 375/232 |
| 2004/0125866 A1 * | 7/2004 | Gryska et al. | .............. | 375/148 |
| 2004/0141548 A1 * | 7/2004 | Shattil | ........................ | 375/146 |
| 2004/0170234 A1 * | 9/2004 | Pukkila et al. | ............. | 375/340 |
| 2005/0176436 A1 * | 8/2005 | Mantravadi et al. | ........ | 455/450 |
| 2005/0201493 A1 * | 9/2005 | Onggosanusi et al. | ...... | 375/340 |
| 2005/0207477 A1 * | 9/2005 | Monsen | ...................... | 375/147 |
| 2005/0265465 A1 * | 12/2005 | Hosur et al. | ................ | 375/260 |
| 2006/0121946 A1 * | 6/2006 | Walton et al. | .............. | 455/561 |
| 2008/0310484 A1 * | 12/2008 | Shattil | ........................ | 375/146 |

* cited by examiner

*Primary Examiner*—Shuwang Liu
*Assistant Examiner*—Kenneth Lam
(74) *Attorney, Agent, or Firm*—Thomas, Kayden, Horstemeyer & Risley, LLP

(57) ABSTRACT

An apparatus and a method for equalizing a received signal to generate an equalized signal are disclosed. The apparatus includes a channel estimator for generating a channel estimation value according to a preamble symbol in the received signal and for generating a channel response value according to the channel estimation value, an interference power estimation circuit for generating an interference power estimate according to a hard decision value, the channel response value, and the received signal, and an equalization circuit for equalizing the received signal according to the channel response value and the adjusted interference power estimate to generate the equalized signal. The hard decision value corresponds to the equalized signal.

20 Claims, 2 Drawing Sheets

US 7,864,905 B2

INTERFERENCE ALLEVIATION EQUALIZING APPARATUS OF MULTI-CARRIER COMMUNICATION SYSTEM AND METHOD THEREOF

BACKGROUND OF THE INVENTION

1. Field of the Invention

The present invention relates to a communication system, and more specifically, to a multi-carrier communication system.

2. Description of the Prior Art

In a general communication system, such as a multi-carrier communication system, if there is interference occurring in a channel between a transmitter and a receiver, the interference will influence signals that will be transmitted to the receiver. Therefore, the signal received by the receiver is a mixed signal of the signal transmitted by the transmitter and an interference signal. In order to eliminate the above-mentioned influences on the received signal, an equalization circuit and a channel estimation circuit are installed in the receiver. The channel estimation circuit is utilized for estimating the weakening and interference resulting from the channel of the received signal according to preamble symbols in the received package. Because the preamble symbols are a series of known symbols, the influence degree of the channel (represented as a channel estimation value) can be determined by comparing the received signal and the known symbols. The operation of the conventional channel estimation circuit is described in the following equation (1):

$$H = \frac{R}{X} \qquad \text{Equation (1)}$$

Where R denotes the received signal, X denotes the known preamble symbol(s), and H denotes the above-mentioned channel estimation value. Next, the equalization circuit processes the received signal R using the channel estimation value H to render an equalized signal. The equalized signal is viewed as a reconstructed signal in which the channel responses are eliminated, and also approximates the signal transmitted by the transmitter.

In fact, a wireless communication system may receive accidental interference from other wireless communication systems. At that time, a change of an external circumstance cannot be compensated for with only a channel estimation value. If there is an accidental interference occurring during the channel estimation operation, the channel estimation value generated by the channel estimation operation may have a serious error, and will further affect an equalized signal generated according to the wrong channel estimation value.

SUMMARY OF THE INVENTION

It is therefore an objective of the claimed invention to provide an apparatus and a method applied in a multi-carrier for equalizing a received signal to generate an equalized signal to solve the above-mentioned problem.

According to the claimed invention, an apparatus for equalizing a received signal to generate an equalized signal is disclosed. The apparatus includes a channel estimator for generating a channel estimation value according to a preamble symbol in the received signal and for generating a channel response value according to the channel estimation value; an equalization circuit for equalizing the received signal according to the channel response value and an interference power estimate to generate the equalized signal; and an interference power estimation circuit for generating the interference power estimate according to a hard decision value, the channel response value, and the received signal; wherein, the hard decision value corresponds to the equalized signal.

In addition, according to the claimed invention, a method is disclosed for equalizing a received signal to generate an equalized signal. The method includes receiving the received signal and generating a channel response value according to a preamble symbol in the received signal; generating an interference power estimate according to the channel response value; and equalizing the received signal to generate the equalized signal according to the channel response value and a channel confidence value; wherein, the channel confidence value corresponds to the interference power estimate.

The apparatus according to the claimed invention equalizes the received signal according to the interference power estimate and the channel response value, and updates the interference power estimate accordingly to increase the accuracy of the equalized signal and substantially improve the error resistance ability of a receiver.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
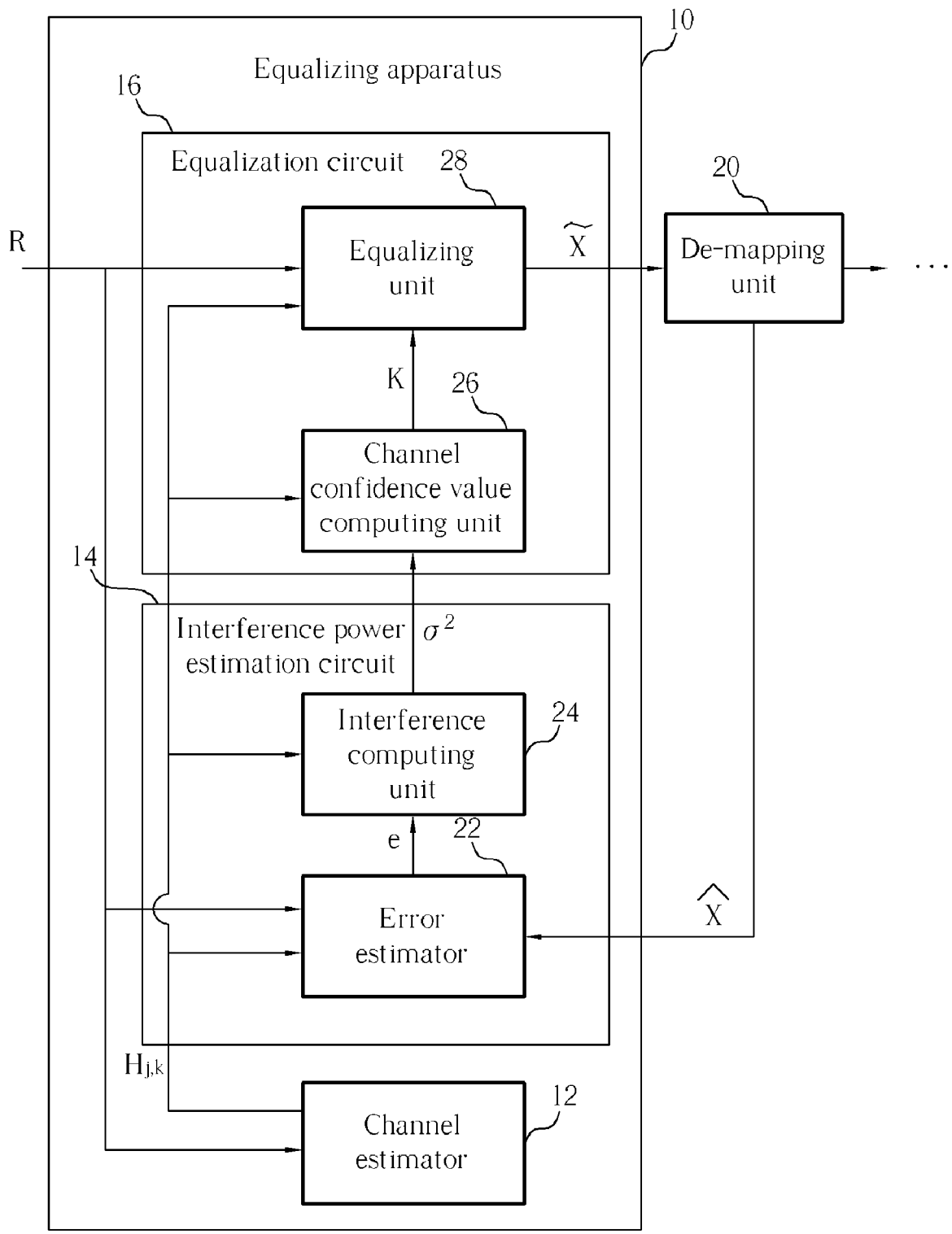
FIG. 1 is a functional block diagram of an equalizing apparatus according to an embodiment of the present invention.

Please refer to FIG. 1. FIG. 1 is a functional block diagram of an equalizing apparatus 10 according to an embodiment of the present invention. The equalizing apparatus 10 is applied in a multi-carrier communication system, and an ultra-wideband (UWB) system utilizing the IEEE 802.15.3a standard is used as an example hereinafter. As shown in FIG. 1, the equalizing apparatus 10 is utilized for equalizing a frequency domain signal R to generate an equalized signal $\tilde{X}$. Please refer to the IEEE 802.15.3a standard for the specification of the frequency domain signal R. In addition, an output end of the equalizing apparatus 10 is coupled to a de-mapping unit 20. The de-mapping unit 20 is a known component for de-mapping the equalized signal $\tilde{X}$ to generate a hard decision value $\hat{X}$. As shown in FIG. 1, the equalizing apparatus 10 comprises a channel estimator 12, an interference power estimation circuit 14, and an equalization circuit 16. The channel estimator 12 is utilized for generating a channel estimation value according to a preamble symbol in the frequency domain signal R. Two channel estimation values $H'_{j,k}$, $H''_{j,k}$ are taken as examples in the present embodiment for describing the operation of the equalizing apparatus 10, wherein j denotes a band index in a multi-carrier communication system; that is, a band j in the multi-carrier communication system. As for k, k denotes a sub-carrier index in the band j. Next, a channel response value $H_{j,k}$ is generated after a computation according to the channel estimation values $H'_{j,k}$, $H''_{j,k}$. In an embodiment, the computation is performed according to the following equation (2):

$$H_{j,k} = \frac{H'_{j,k} + H''_{j,k}}{2} \qquad \text{Equation (2)}$$

The interference power estimation circuit 14 according to the embodiment is utilized for generating an interference power estimate $\sigma^2$ according to the channel estimation values $H'_{j,k}$, $H''_{j,k}$ and a hard decision value $\hat{X}$. Afterwards, the equalization circuit 16 is utilized for equalizing the frequency domain signal R according to the channel response value $H_{j,k}$ and the interference power estimate $\sigma^2$ to generate the equalized signal $\tilde{X}$. A detailed description of the operations of the interference power estimation circuit 14 and the equalization circuit 16 is described in the following.

In an embodiment, the interference power estimation circuit 14 comprises an error estimator 22 and an interference computing unit 24. The error estimator 22 is utilized for generating an error amount e according to the received signal R, the channel response value $H_{j,k}$, and the hard decision value $\hat{X}$ generated according to the channel response value $H_{j,k}$. The operation of the error estimator 22 is described in the following equation (3):

$$e_{i,j,k} = R_{i,j,k} - H_{j,k} \cdot \hat{X}_{i,j,k} \qquad \text{Equation (3)}$$

In equation (3), i denotes a symbol index of band j, j denotes a band index, and k denotes a sub-carrier index. Here the error amount e represents accidental interference in the channel. Ideally, a result generated by multiplying a reconstructed signal (represented as the hard decision value $\hat{X}$) of the receiver by the channel response value $H_{j,k}$ should be equal to the received signal R. Hence, it is reasonable to presume that the error amount e results from the accidental interference in the channel. Hence, the error amount e is transmitted to the interference computing unit 24 for updating the original interference power estimate. The operation is described as follows:

$$\sigma^2_{i+1,j,k} = \lambda \cdot \sigma^2_{i,j,k} + (1-\lambda) \cdot |e_{i,j,k}|^2 \qquad \text{Equation (4)}$$

In equation (4), $\lambda$ is a weighting factor. The smaller $\lambda$ is, the larger the range adjusted for the interference power estimate $\sigma^2$ is. In the present embodiment, the original interference power estimate $\sigma_0^2$ is generated by the interference computing unit 24 according to the channel estimation values $H'_{j,k}$, $H''_{j,k}$. The operation is described in the following equation (5):

$$\sigma_0^2 = \frac{1}{4} \times |H'_{j,k} - H''_{j,k}|^2 \qquad \text{Equation (5)}$$

In equation (5), j denotes a band index, and k denotes a sub-carrier index. $H'_{j,k}$ is utilized for representing the channel estimation value generated according to a first symbol of the header symbols, and $H''_{j,k}$ is utilized for representing the channel estimation value generated according to a second symbol of the header symbols.

In the present embodiment, the equalization circuit 16 comprises a channel confidence value computing unit 26 and an equalizing unit 28. The channel confidence value computing unit 26 generates a weighting factor $\mu$ according to the interference power estimate $\sigma^2$. In an embodiment, when the interference power estimate $\sigma^2$ is smaller than a threshold limit value, the weighting factor $\mu$ is set to be 1. When the interference power estimate $\sigma^2$ is not less than the threshold limit value, the weighting factor $\mu$ is set to be 10. The weighting factor $\mu$ can be determined according to a design consideration, and is not limited to the values "1" or "10". The channel confidence value computing unit 26 generates a channel confidence value K according to the channel response value $H_{j,k}$, the weighting factor $\mu$, and the interference power estimate $\sigma^2$. The operation of the channel confidence value computing unit 26 is described in the following equation (6):

$$\kappa = \frac{|H_{j,k}|^2}{|H_{j,k}|^2 + \mu \cdot \sigma^2_{i,j,k}} \qquad \text{Equation (6)}$$

In equation (6), the channel confidence value K is utilized for representing the reliability of the equalized signal $\tilde{X}$; that is, an effect results from the interference occurring in the channel (represented as the interference power estimate $\sigma^2$) on the equalized signal $\tilde{X}$. There may possibly be a great difference between the channel response value $H_{j,k}$ estimated by the receiver and the actual channel response value $H_{j,k}$. Therefore, according to this embodiment, the weighting factor $\mu$ is utilized for adjusting the interference power estimate $\sigma^2$ in order to increase an influence provided by the interference power estimate $\sigma^2$ on the channel confidence value K when the interference is very great; that is, equivalently decreasing the weight of the channel response value $H_{j,k}$ in the channel confidence value K. Eventually, the channel confidence value K is transmitted to the equalizing unit 28. The equalizing unit 28 then equalizes the received signal R according to the channel response value $H_{j,k}$ and the channel confidence value K to generate the equalized signal $\tilde{X}$. The above-mentioned operation is described as follows:

$$\tilde{X} = \kappa \cdot \frac{R_{i,j,k}}{H_{j,k}} \qquad \text{Equation (7)}$$

Figure 2:
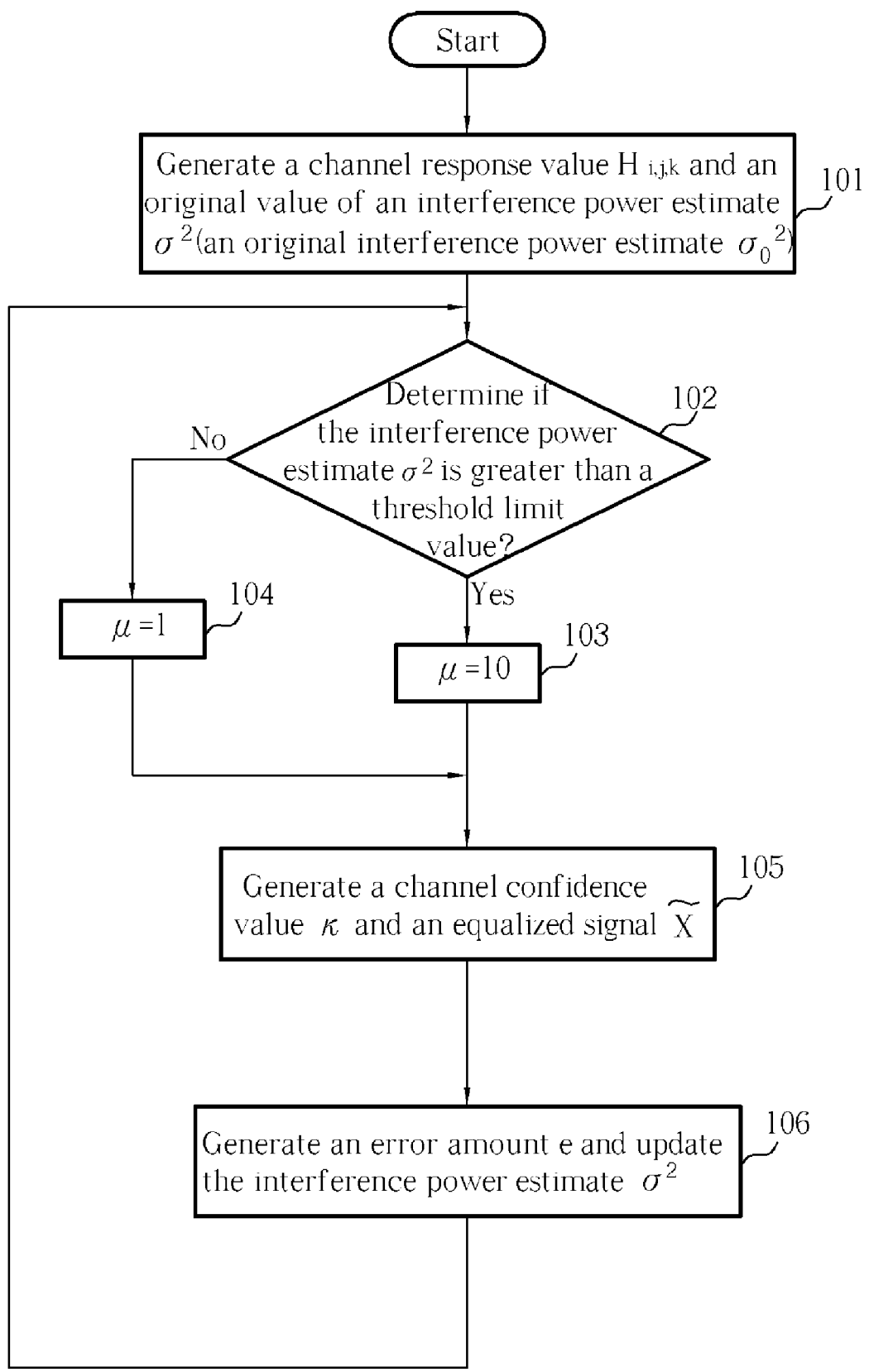
FIG. 2 is a flowchart describing generating an equalized signal according to an embodiment of the present invention.

The principles of the operations of the equalizing apparatus 10 in the embodiment are described using the above equations (2) to (7). However, a clear description of the interference equalizing apparatus 10 is provided in FIG. 2. FIG. 2 is a flowchart describing generating an equalized signal according to an embodiment of the present invention. The flow contains the following steps:

Step 101: Generate a channel response value $H_{i,j,k}$ according to equation (2), and generate an original value of an interference power estimate $\sigma^2$ (an original interference power estimate $\sigma_0^2$) according to equation (5).

Step 102: Determine if the interference power estimate $\sigma^2$ is greater than the threshold limit value; if so, proceed to step 103; otherwise, proceed to step 104.

Step 103: Set a weighting factor $\mu$ to be 10, and then proceed to step 105.

Step 104: Set the weighting factor $\mu$ to be 1, and then proceed to step 105.

Step 105: Generate a channel confidence value K according to equation (6), and generate the equalized signal $\tilde{X}$ according to equation (7).

Step 106: Generate an error amount e according to equation (3), and update the interference power estimate $\sigma^2$ according to equation (4); then proceed to step 102.

The equalizing apparatus according to the present invention generates an equalized signal $\tilde{X}$ and adjusts the equalized signal $\tilde{X}$ according to a channel confidence value K. The channel confidence value K represents interference occurring in the channel (represented as an interference power estimate $\sigma^2$). When the interference is excessively great, the interference power estimate $\sigma^2$ is adjusted using a weighting factor $\mu$ in order to decrease an influence provided by the interference power estimate $\sigma^2$ on the channel confidence value K, and the weight of a channel response value $H_{j,k}$ in the channel confidence value K are decreased accordingly. Therefore, the equalizing apparatus described above can substantially decrease the influences resulting from the interference on the receiver, and improve the interference alleviation ability of the receiver.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An apparatus for equalizing a received signal to generate an equalized signal, comprising:
   a channel estimator for generating channel estimation values $H'_{j,k}$ and $H''_{j,k}$, wherein j denotes a band index in a multi-carrier communication system and k denotes a subcarrier index in the band j,
   according to a preamble symbol in the received signal and for generating a channel response value $H_{j,k}$ according to an average value of the channel estimation values, wherein $H_{j,k}=H'_{j,k}+H''_{j,k}/2$;
   an equalization circuit for equalizing the received signal according to the channel response value and an interference power estimate to generate the equalized signal; and
   an interference power estimation circuit for generating the interference power estimate according to a hard decision value, the channel estimation values, and the received signal;
   wherein the hard decision value corresponds to the equalized signal.

2. The apparatus of claim 1, wherein the interference power estimation circuit comprises:
   an error estimator for generating a reconstructed signal according to the channel response value and the hard decision value, and for generating an error amount according to a difference value between the reconstructed signal and the received signal; and
   an interference computing unit for updating the interference power estimate according to the error amount and a weighting factor.

3. The apparatus of claim 1, wherein the equalization circuit comprises:
   a channel confidence value computing unit for generating a channel confidence value; and
   an equalizing unit for equalizing the received signal according to the channel response value and the channel confidence value to generate the equalized signal.

4. The apparatus of claim 3, wherein the channel confidence value computing unit adjusts the channel confidence value according to the interference power estimate.

5. The apparatus of claim 3, wherein the channel confidence value computing unit generates the channel confidence value according to a weighting factor, the channel response value, and the interference power estimate.

6. The apparatus of claim 5, wherein the channel confidence value computing unit adjusts the weighting factor according to the amount of the interference power estimate.

7. The apparatus of claim 1 being applied in a multi-carrier communication system.

8. An apparatus for equalizing a received signal to generate an equalized signal, comprising:
   a channel estimator for generating channel estimation values $H'_{j,k}$ and $H''_{j,k}$, wherein j denotes a band index in a multi-carrier communication system and k denotes a subcarrier index in the band j,
   according to a preamble symbol in the received signal and for generating a channel response value $H_{j,k}$ according to an average value of the channel estimation valuses, wherein $H_{j,k}=H'_{j,k}+H''_{j,k}/2$;
   an equalization circuit for equalizing the received signal according to a channel confidence value and the channel response value to generate the equalized signal; and
   an interference power estimation circuit for generating an interference power estimate according to the channel estimation values, wherein the channel confidence value corresponds to the interference power estimate.

9. The apparatus of claim 8, wherein the equalization circuit comprises:
   a channel confidence value computing unit for generating the channel confidence value according to a first weighting factor, the interference power estimate, and the channel response value.

10. The apparatus of claim 8, wherein the channel confidence value computing unit is utilized for comparing the interference power estimate and a threshold limit value to generate the first weighting factor.

11. The apparatus of claim 8, wherein the interference power estimation circuit comprises:
    an error estimator for generating a reconstructed signal according to the channel response value and a hard decision value, and for generating an error amount according to a difference value between the reconstructed signal and the received signal, wherein the hard decision value corresponds to the equalized signal; and
    an interference computing unit for updating the interference power estimate according to the error amount.

12. The apparatus of claim 8, being applied in a multi-carrier communication system.

13. A method for equalizing a received signal to generate an equalized signal, comprising:
    receiving the received signal and generating channel estimation values $H'_{j,k}$ and $H''_{j,k}$, wherein j denotes a band index in a multi-carrier communication system and k denotes a subcarrier index in the band j, according to a preamble symbol in the received signal;
    generating a channel response value $H_{j,k}$ according to an average value of the channel estimation valuses, wherein $H_{j,k}=H'_{j,k}+H''_{j,k}/2$;
    equalizing the received signal according to the channel response value and an interference power estimate to generate the equalized signal; and
    generating and updating the interference power estimate according to a hard decision value, the channel response value, and the received signal;
    wherein, the hard decision value corresponds to the equalized signal.

14. The method of claim 13, wherein the step of generating and updating the interference power estimate comprises:
    generating a reconstructed signal according to the channel response value and the hard decision value;
    generating an error amount according to a difference value between the reconstructed signal and the received signal; and
    updating the interference power estimate according to the error amount and a weighting factor.

15. The method of claim 13, wherein the step of generating the equalized signal comprises:
   adjusting a channel confidence value according to the interference power estimate; and
   equalizing the received signal according to the channel response value and the channel confidence value to generate the equalized signal.

16. The method of claim 15, wherein the step of adjusting the channel confidence value comprises comparing the interference power estimate and a threshold limit value to generate a weighting factor, and generating the channel confidence value according to the weighting factor, the channel response value, and the interference power estimate.

17. A method for equalizing a received signal to generate an equalized signal, comprising:
   receiving the received signal and generating channel estimation values $H'_{j,k}$ and $H''_{j,k}$, wherein j denotes a band index in a multi-carrier communication system and k denotes a subcarrier index in the band j, according to a preamble symbol in the received signal;
   generating a channel response value $H_{j,k}$ according to an average value of the channel estimation valuses, wherein $H_{j,k} = H'_{j,k} + H''_{j,k}/2$;
   generating an interference power estimate according to the channel estimation value; and
   equalizing the received signal according to a channel confidence value and the channel response value to generate the equalized signal, wherein the channel confidence value corresponds to the interference power estimate.

18. The method of claim 17, further comprising:
   generating the channel confidence value according to the first weighting factor, the interference power estimate, and the channel response value.

19. The method of claim 18, wherein the step of generating the channel confidence value comprises comparing the interference power estimate and a threshold limit value to generate the first weighting factor.

20. The method of claim 17, wherein the step of generating the interference power estimate comprises:
   generating a reconstructed signal according to the channel response value and a hard decision value, wherein the hard decision value corresponds to the equalized signal;
   generating an error amount according to a difference value between the reconstructed signal and the received signal; and
   generating the interference power estimate according to a mean-square error of the channel estimation value.

* * * * *